(12) United States Patent
Fu et al.

(10) Patent No.: US 11,255,767 B2
(45) Date of Patent: Feb. 22, 2022

(54) METHOD FOR MEASURING LIGHT FIELD DISTRIBUTION AND DEVICE THEREFOR

(71) Applicants: Zhejiang Lab, Zhejiang (CN); Zhejiang University, Zhejiang (CN)

(72) Inventors: Zhenhai Fu, Zhejiang (CN); Cheng Liu, Zhejiang (CN); Zhiming Chen, Zhejiang (CN); Xingfan Chen, Zhejiang (CN); Nan Li, Zhejiang (CN); Huizhu Hu, Zhejiang (CN)

(73) Assignees: Zhejiang Lab, Zhejiang (CN); Zhejiang University, Zhejiang (CN)

( * ) Notice: Subject to any disclaimer, the term of this patent is extended or adjusted under 35 U.S.C. 154(b) by 0 days.

(21) Appl. No.: 17/372,419

(22) Filed: Jul. 10, 2021

(65) Prior Publication Data

US 2021/0333190 A1    Oct. 28, 2021

(30) Foreign Application Priority Data

Jul. 13, 2020    (CN) .......................... 202010667605.1

(51) Int. Cl.
| | | |
|---|---|---|
| *G01N 15/02* | (2006.01) | |
| *G01N 15/06* | (2006.01) | |
| *G03H 1/00* | (2006.01) | |

(52) U.S. Cl.
CPC ......... *G01N 15/0211* (2013.01); *G01N 15/06* (2013.01); *G01N 2015/0693* (2013.01); *G03H 2001/0077* (2013.01)

(58) Field of Classification Search
CPC ....... G01N 15/0211; G01N 2015/0693; G03H 2001/0077
See application file for complete search history.

(56) References Cited

FOREIGN PATENT DOCUMENTS

| CN | 210242983 U | 4/2020 |
|---|---|---|
| WO | 2018047547 A | 9/2018 |

OTHER PUBLICATIONS

Ma Ningsheng et al. Optical Experiments, Tongji University Press, Jun. 30, 2016, pp. 114-115.
Thomas Bauer, Nanointerferometric amplitude and phase reconstruction of tightly focused vector beams, Nature photonics, 2014, vol. 8, pp. 23-27.
Haiqiang Liu et al. Error Chracteristics of laser beam quality based on knife-edge measuring method, Laser and optoelectronics progress, 2016, vol. 53, pp. 121402-1-121402-6.

(Continued)

*Primary Examiner* — Rebecca C Bryant

(57) ABSTRACT

A method and a device for measuring light field distribution are provided; including steps of utilizing the optical trap to stably levitating particles, moving the optical trap to bring the particles close to the light field to be measured, and utilizing the photodetector to collect the scattered light signals of the particles at different positions in the three-dimensional space of the light field to be measured, and calculating the light field distribution of the light field to be measured according to the scattered light intensity which is proportional to the light intensity at that position. The device for measuring the optical field distribution includes a laser, an optical trapping path, particles, a photodetector, a control system and an upper computer; the laser emits a laser, passes through the optical trapping path, and emits highly focused captured light B to form an V optical trap to capture particles.

5 Claims, 1 Drawing Sheet

(56) References Cited

OTHER PUBLICATIONS

Zhibin Yin et al. Research amd standardization on diagnostic of laser beam characteristics, Laser and Optoelectronics progress vol. 48, pp. 081406-1-081406-6.
Yongai Yu Real-time laser beam quality measurement technique, Chinese Journal of lasers, vol. 34, No. 2, Feb. 2017, pp. 255-258.
Pau Mestres et al. Cooling and manipulation of levitated nanoparticle with an optical fiber trap, Applied Physics Letters 107, 151102 (2015); doi: 10.1063/1.4933180.
Jamie Vovrosh et al. Parametic feedback cooling of levitated optomechanics in aparabolic mirror trap, quanti-ph 23, Jan. 2017.
Nan Li et al. Review of optical tweezers in a vacuum, From inform technol electron Eng 2019 20 (5):656-673.

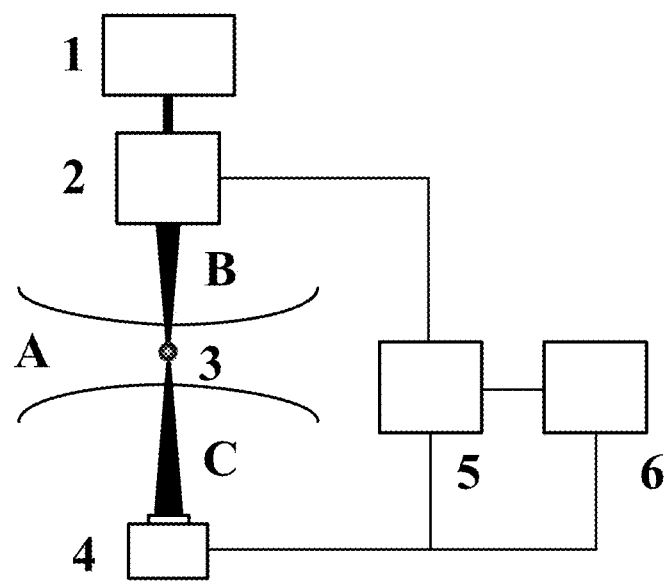

METHOD FOR MEASURING LIGHT FIELD DISTRIBUTION AND DEVICE THEREFOR

CROSS REFERENCE OF RELATED APPLICATION

The present application claims priority under 35 U.S.C. 119(a-d) to CN 202010667605.1, filed Jul. 13, 2020.

BACKGROUND OF THE PRESENT INVENTION

Field of Invention

The present invention relates to a method for measuring light field distribution and a device therefore.

Description of Related Arts

The beam quality which directly affects the application range and efficiency of the laser, is an important parameter to evaluate the quality of the laser beam. The key to beam quality measurement is to measure the energy distribution of the spot and determine the beam width of the laser beam. Commonly used light field distribution and beam waist measurement methods are as follows.

(1) Hole method or small hole scanning method: from the national standard "Laser Radiation Beam Diameter Test Method" (GB/T137411992), put the aperture r in the optical path, and make it slightly smaller than the spot radius ω, Calculate the transmittance T by measuring the energy ratio with or without aperture:

$$T = 1 - \exp\left[-2\left(\frac{r}{\omega}\right)^2\right]$$

According to the transmittance T, the spot radius is expressed as:

$$\omega = r\{2/[-\ln(1-T)]\}^{1/2}.$$

Or use the small hole to detect the normalized light intensity distribution curve, and then calculate the spot radius at that place.

(2) Knife edge method: from the national standard "Solid Laser Test Method" (GJB5441-2005), the knife edge is placed on the optical axis between the laser and the power meter (or energy meter), and the knife edge is placed on a mechanical platform along the optical axis. Moving in the x direction perpendicular to the beam, the output spot is gradually blocked, and the power (or energy) entering the power meter (or energy meter) gradually decreases. The transmitted laser power measured by the detector is a function of the knife edge position. Record the corresponding geometric positions x1 and x2 when the power meter (or energy meter) reads 84% and 16% of the original power (or energy);

$$d_x = 2|x_1 - x_2|$$

Calculate the beam diameter dx in the x direction.

(3) CCD method: from the national standard "Solid-state laser test method" (GJB5441-2005), place the CCD probe vertically at the optical axis, select an appropriate attenuation, and make full use of the CCD dynamic range to measure the beam cross-section Then calculate the beam diameter according to the second moment of the light intensity distribution.

(4) Hollow probe measurement method: from the national standard "Industrial High Power Laser Beam Quality Test and Evaluation Method" (GB/T246642009), it works with the help of a rotating hollow needle capable of transmitting laser beams. A constant speed motor drives a Hollow probe, the probe rotates so that the microhole scans the light spot. There is a small hole on the side surface of one end of the hollow needle.

During the transient process of passing through the beam section, the laser beam entering from the small hole is guided to the rotating shaft through the inner cavity, where it is detected by the detector. The rotating system can be translated perpendicular to the direction of the beam under the control of the stepper motor. With the translation of the entire probe holder, a series of arcs can be drawn. At the same time, the high-speed sampling system samples the signal output by the pyroelectric detector and sends it Enter the subsequent circuit for processing. The sampling process is completed at the instant of scanning the spot. Thus, the light intensity distribution on the cross section of the beam is detected, and the power density distribution of the entire light spot is scanned. When measuring beams of different intensities and sizes, probes with different apertures can be selected, and the translational step length can be adjusted at the same time, so that the requirements for measuring unfocused beams can be met, and the measurement of focused spots can also be achieved.

The above-mentioned various methods are characterized in that the spatial resolution of the light field distribution measurement is limited by the size of the measurement unit (hole or pixel). For example, the spatial resolution of the sleeve hole method, the small hole scanning method and the hollow probe measurement method depends on the size of the small hole. Generally, the diameter of the small hole is 15-50 μm when measuring the focused spot; when measuring the unfocused beam, the small hole The diameter is 100-500 μm; when the size of the small hole is too small, the optical diffraction effect will bring greater error to the measurement result, and the difficulty of processing the small hole will further increase; the spatial resolution of the CCD method depends on the size of the pixel element, which is also generally on the order of microns.

Therefore, the spatial resolution of these methods can only reach the order of microns. For the light field distribution of the highly focused spot, especially the beam waist size is smaller than the light field of the measuring unit, it cannot be directly measured, so it is difficult to accurately obtain three-dimensional light intensity distribution of the light field.

SUMMARY OF THE PRESENT INVENTION

In order to overcome the shortcomings of the prior art, the present invention provides a method and device for measuring light field distribution.

A method for measuring the light field distribution, comprises steps of: stably levitating suspended particles by an optical trap; moving the optical trap to bring the particles levitated close to a light field to be measured, collecting scattering beam of the particles at different positions in a three-dimensional space of the light field to be measured by a photodetector; calculating the light field distribution of the light field to be measured according to the scattered beam intensity, which is proportional to the light intensity at the position.

The signal collected by the photodetector is the scattering beam of the light field to be measured by the particle, and does not include the scattered beam of trapping beam by the particle;

In order to eliminate the influence of the beam scattered by particles from the trapping beam field on the measurement results, priority is given to selecting a wavelength of the optical trapping beam from a wavelength band different from the light field to be measured; if a wavelength of the optical trapping beam is close to the wavelength of the light field to be measured, a filter is added in front of the photodetector to filter out the scattered light of the trapping beam by the particles; When the wavelength of the field is the same as the wavelength of the light field to be measured, the beam propagation direction of the light field to be measured is at an angle with the propagation direction of the trapping beam, and the scattering beam of the light field to be measured by the particle is collected from a direction perpendicular to of the trapping beam The photodetector converts the light intensity of the scattering beam of the light field to be measured by the particle into a physical quantity directly related to the light intensity, including light intensity, light power, and brightness.

The particles scan the light field to be measured point by point, and the measurement spatial resolution of the light field to be measured is equal to the length of the scanning interval.

A device for measuring light field distribution using the method, comprises: a laser, an optical trapping path, particles, a photodetector, a control system, and an upper computer; the laser emits laser light, passes through the optical trapping path, and emits highly focused trap light B, forming an optical trap to capture particles; the particles are at a certain position in the light field A to be measured, and the scattered light C is collected by the photodetector; the photodetector uploads the scattered light signal to the upper computer; the relative position between the particles and the photodetector is fixed, and the control system synchronously controls the position of the particles and the photodetector, so that the particles scan the light field A to be measured point by point; the upper computer calculates the light field distribution of the light field A to be measured according to the scattered light signals obtained at different positions.

The optical trap comprises a single beam optical trap or a double beam optical trap.

The photodetector may adopts CCD, CMOS, light intensity meter, light power meter, and brightness meter.

The scanning step length of the control system brings the spatial resolution of the light field measured by the device to reach the order of nanometers.

The Beneficial Effects of the Present Invention

The three-dimensional light intensity distribution of the light field can be accurately obtained, and the spatial resolution of the light field measurement can be improved to the nanometer level.

BRIEF DESCRIPTION OF THE DRAWINGS

The FIGURE is a schematic diagram of a structure of the device of the present invention;

As shown in the FIGURE, 1—laser 1; 2—optical trapping path; 3—particles; 4—photodetector; 5—control system; 6—upper computer.

DETAILED DESCRIPTION OF THE PREFERRED EMBODIMENT

The present invention will be further described below in conjunction with the drawings and embodiments.

A method for measuring the light field distribution, comprises steps of:

stably levitating particles by an optical trap; moving the optical trap to bring the particles levitated close to a light field to be measured, collecting scattering beam of the particles at different positions in a three-dimensional space of the light field to be measured by a photodetector; wherein a scattered beam intensity is proportional to a light intensity at the position; the stronger the beam intensity, the stronger the scattering beam; the light intensity of the light field to be measured in different positions in the three-dimensional space can be obtained by moving the position of the particles point by point.

The ratio of a wavelength of particles in the light field to be measured to a beam wavelength is:

$$\sigma = \frac{2\pi r}{\lambda}$$

wherein r is a radius of the particle and $\lambda$ is the beam wavelength. According to the scattering theory, when $\sigma \ll 1$, Rayleigh scattering is performed on the light field scattered by the particles; when $\sigma \approx 1$, the Mie scattering is performed on the light field; when $\sigma \gg 1$, scattering is performed by regarding the particles as geometric lens. In either case, the intensity of scattered beam in a certain scattering angle direction is proportional to the intensity of the light field where the particles are located. Taking Rayleigh scattering as an example, the intensity of scattered beam can be expressed as:

$$I \propto I_0 \frac{1+\cos^2\theta}{2d^2} \left(\frac{2\pi}{\lambda}\right)^4 \left(\frac{n^2-1}{n^2+2}\right)^2 r^6$$

wherein $I_0$ is a light intensity at a position where the particles located, $\theta$ is a scattering angle, i.e., an angle between an observation direction of the photodetector and a beam propagation direction, d is a distance between the photodetector and the particles to be measured, and n is a relative refractive index between the particles and a environmental medium.

As shown in FIG. 1, a device for measuring light field distribution comprises a laser 1, an optical trapping path 2, a plurality of particles 3, a photodetector 4, a control system 5, and an upper computer 6.

The laser 1 emits laser light, passes through the optical trapping path 2, and emits highly focused trap light B to form an optical trap to capture the particles 3 (standard particles are used in the Figs.); the particles 3 are located at a certain position in the light field A to be measured, the scattered light C is collected by the photodetector 4; the photodetector 4 uploads the scattered light signal to the upper computer 6; the relative position of the particles 3 and the photodetector 4 is fixed, and the control system 5 synchronously controls positions of the particles 3 and the photodetector 4 so that the particles 3 scan the light field A to be measured point by point; the upper computer 6 calculates the light field distribution of the light field A to be measured according to the scattered light signals obtained at different positions.

For those skilled in the art, the present invention can have various modifications. as follows.

(1) Depending on the optical trapping path, the formed optical trap can be a single-beam optical trap or a double-beam optical trap.

(2) Standard particles are optically uniform medium particles with known size, density and scattering characteristics, with sizes ranging from nanometers to micrometers; the size of the particles only affects the scattering model and the structure of the optical trap used in the detection process.

(3) The light field can be located in the environment of liquid, air or vacuum.

(4) The wavelength of the light field to be measured and the wavelength of the trapping beam can be the same or different; if the two are the same, a filter needs to be added in front of the detector to filter out the scattered light of the trapping beam by the particles.

(5) The propagation direction of the light beam to be measured and the propagation direction of the optical trapping beam can be at any angle.

(6) The photodetector can be a CCD or CMOS, or a light intensity meter, an optical power meter, or a luminance meter, as long as the detector can obtain a physical quantity directly related to the light intensity, which can be light intensity, optical power and brightness etc.

(7) The scattering angle range of the scattered light collected by the photodetector can be at a range of 0-180° C. When the scattering angle is 0° C., it corresponds to the forward scattered light; when the scattering angle is 90° C., it corresponds to the right side scattered light; and when the scattering angle is 180° C., it corresponds to the backward (back) scattered light.

(8) When measuring beams of different sizes, particles of different sizes can be selected, and the scanning step length of the control system can be adjusted at the same time. The scanning step length and particle size jointly determine the spatial resolution of the measured light field, which can generally reach the order of nm.

Application Embodiment

The light field A to be measured is a focused light field of a 532 nm laser passing through a microscope objective lens with a numerical aperture NA=0.9, which is in Gaussian-like distribution.

Its theoretical beam waist size and Rayleigh distance are both less than 1 μm, which is smaller than the size of ordinary small holes or CCD camera pixel elements. Therefore, it is impossible to measure the light field distribution by general methods. The method provided by the present invention can be used to measure the light field distribution, especially to calibrate the waist size.

The laser 1 adopts a 1064 nm single-mode laser, and the optical trapping path 2 comprises a pair of collimating lenses, a pair of mirrors and a focusing objective lens; wherein the laser light emitted by the laser 1 is collimated and focused by the optical trapping path to form a single beam optical trap; a standard sample of silica microspheres with a nominal diameter of 50 nm is adopted; the photodetector 4 adopts a light-emitting diode light meter, add a filter above a probe of the photodetector 4 to filter out stray light with a wavelength of 1064 nm in the scattered light. Only the scattered beam of the light field to be measured is received. The detection signal is inputted to the upper computer for processing by the beam intensity meter; wherein the control system 5 is a stepping motor control system, which controls the position of the optical element in the optical trapping path 2 and drives the light intensity meter, so as to maintain the relative position of the silica particles and the beam intensity meter unchanged during the measurement process.

The single-beam optical trap captures a single silica particle and is close to the light field to be measured; when the particle is located in the beam waist plane of the light field to be measured, the stepping motor system drives the particles and the light intensity meter in the direction perpendicular to the light field to be measured. The upper computer collects scattered light signals at different positions in the entire beam waist plane, so as to obtain the light field distribution in the beam waist plane; the scanning step of the stepper motor system is 5 nm, which is smaller than the beam waist of the light field to be measured, in such a manner that the beam waist information of the light field to be measured can be accurately obtained.

The particles move a certain displacement along the optical axis, and repeat the above steps to obtain the light field distribution on different beam cross sections; based on the light field distribution of different beam cross sections, in such a manner that the light intensity of the light field to be measured in different positions of the three-dimensional space can be obtained.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for measuring the light field distribution, comprising steps of: stably levitating particles by an optical trap; moving the optical trap to bring the particles levitated close to a light field to be measured, collecting scattering beam of the particles at different positions in a three-dimensional space of the light field to be measured by a photodetector; calculating the light field distribution of the light field to be measured according to the scattered beam intensity, which is proportional to the light intensity at the position;

wherein the signal collected by the photodetector is the scattering beam of the light field to be measured by the particle, and does not include the scattered beam of trapping beam by the particle.

wherein the photodetector converts the light intensity to be measured scattered light by particle into the physical quantity directly related to the light intensity, including light intensity, optical power and brightness.

wherein the particles scan the light field to be measured point by point, and the measurement spatial resolution of the light field to be measured is equal to a length of the scanning interval.

2. A device for measuring light field distribution adopting the method of claim 1, comprising: a laser, an optical trapping path particles, a photodetector, a control system, and an upper computer; the laser emits laser light, passes through the optical trapping path, and emits highly focused trap light B, forming an optical trap to capture particles; the particles are at a certain position in the light field A to be measured, and the scattered light C is collected by the photodetector; the photodetector uploads the scattered light signal to the upper computer; the relative positional relationship between the particles and the photodetector is fixed, and the control system synchronously controls the position of the particles and the photodetector, so that the particles scan the light field A to be measured point by point; the upper computer calculates the light field distribution of the light field A to be measured according to the scattered light signals obtained at different positions.

3. The device as recited in claim 2, wherein the optical trap comprises single beam optical trap or double beam optical trap.

4. The device as recited in claim 2, wherein the photodetector adopts CCD, CMOS, light intensity meter, light power meter or brightness meter.

5. The device as recited in claim 2, wherein the scanning step length of the control system brings the spatial resolution of the light field measured by the device to reach the order of nanometers.

\* \* \* \* \*